W. A. ROTH & F. O. MOLDENHAUER.
WIPER FOR WINDOWS AND THE LIKE.
APPLICATION FILED DEC. 21, 1911.
1,041,172.
Patented Oct. 15, 1912.
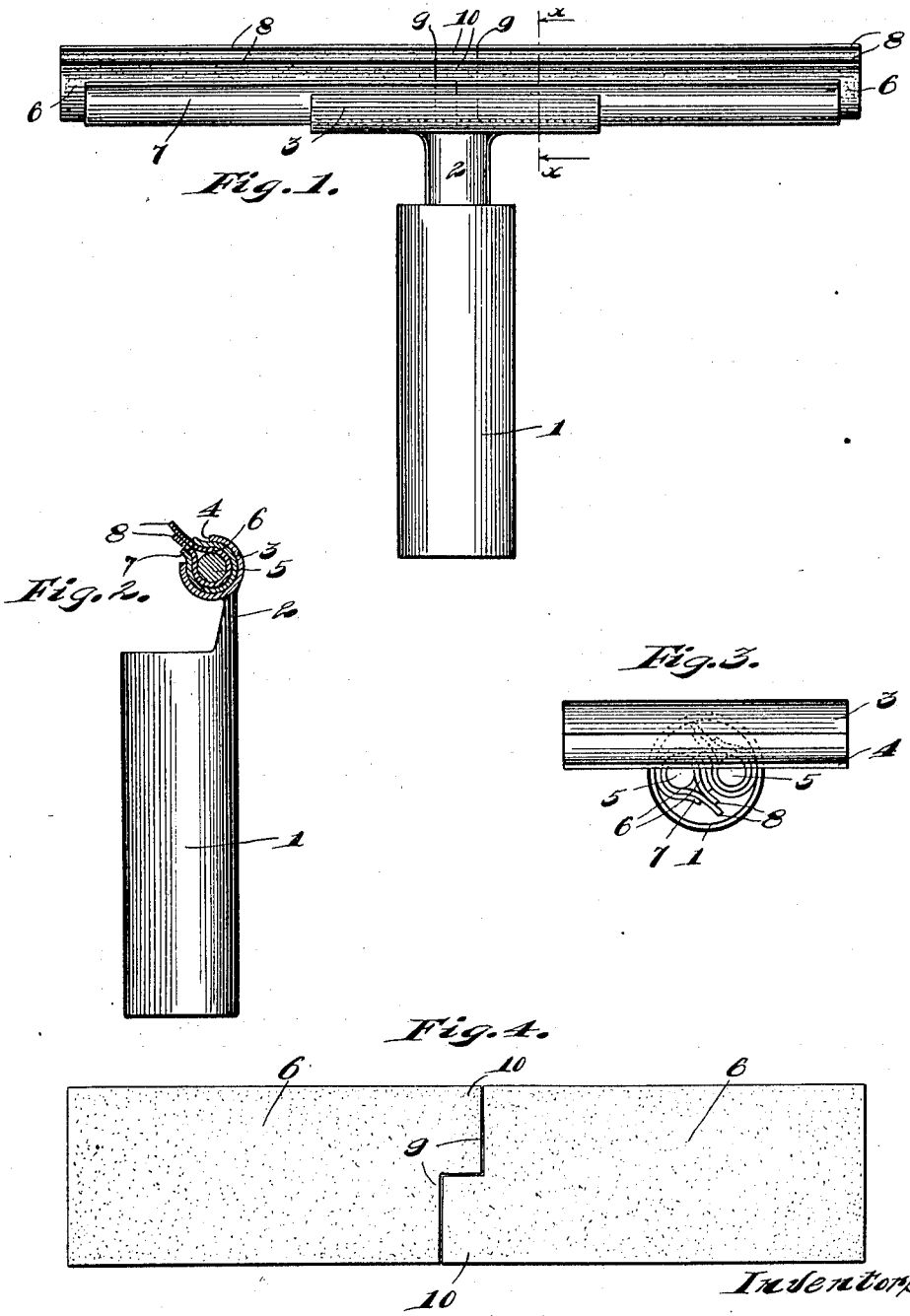

UNITED STATES PATENT OFFICE.

WALTER A. ROTH AND FRANK O. MOLDENHAUER, OF CHICAGO, ILLINOIS.

WIPER FOR WINDOWS AND THE LIKE.

1,041,172.  Specification of Letters Patent.  Patented Oct. 15, 1912.

Application filed December 21, 1911. Serial No. 667,082.

*To all whom it may concern:*

Be it known that we, WALTER A. ROTH and FRANK O. MOLDENHAUER, citizens of the United States, and residents of the city of Chicago, county of Cook, and State of Illinois, have invented certain new and useful Improvements in Wipers for Windows and the Like, of which the following is a specification.

Our invention relates to improvements in wipers for windows and the like and has for its object the provision of a device of this character which may be readily taken apart and carried in compact form.

The invention consists in the combinations and arrangements of parts hereinafter described and claimed.

The invention will be best understood by reference to the accompanying drawing forming a part of this specification, and in which, Figure 1 is a front elevation of a wiper embodying our invention, Fig. 2, a section taken on line x—x of Fig. 1, Fig. 3, a top plan view of the wiper shown in folded or compact form, and Fig. 4, a plan view of the sheet of rubber from which the wiper proper is formed.

The preferred form of construction as illustrated in the drawing comprises a tubular handle 1 having a neck 2 extending upwardly from one side thereof. A tubular holder or socket 3 is arranged at the upper end of neck 2 and extends transversely with respect to handle 1 as shown. Holder 3 is cylindrical in form and extends inwardly and upwardly from the neck 2, a slot 4 being formed in the inner upper side of said holder. A wiper member is made in two parts adapted to be removably inserted in holder 3 in alinement with each other. Each of these wiper parts comprises a cylindrical wooden core 5 and a rubber sheet 6 secured about core 5 by means of a metallic clamping sleeve 7 as indicated. The sheet 6 is so positioned upon core 5 as to cause its ends 8 to project from sleeve 7 unequally and thus form two adjacent wiping edges as is common in devices of this character. Each of the sheets 6 is formed from a single sheet cut centrally on a zig-zag line 9 so as to form overlapping similar flaps 10 on the inner adjacent ends of said sheets. When the sheets 6 are secured around cores 5 and the wiper member parts are inserted in holder 3, flaps 10 overlap each other as shown in Fig. 1 and thus break the joint between the inner ends of the wiper member parts while the core and clamping sleeve abut each other. The tubular handle member 1 is made of a size to frictionally receive and hold the wiper member parts as indicated in Fig. 3.

It will be seen that by connecting the strips 6 by the overlapping flaps 10, a sectional wiper is provided, the combined lengths of the sections thereof being equivalent in length to the customary rigid wiper, and the joint between the sections being staggered for the purpose of providing an unbroken surface in one side of the wiper to operate over the path of the joint in the opposite side. This entirely eliminates the ridge of water upon the glass, which would normally be created by a straight joint, and also the necessity of operating twice over the same surface.

The device is used as an ordinary window wiper, and when not desired for use, the wiper member parts may be readily removed from and inserted in handle 1 when the device may be readily carried in the pocket of the user. When desired for use the wiper member parts may be readily removed from handle 1 and inserted in holder 3. The device is especially adapted for use by motormen and chauffeurs in wiping snow or rain from the windows or wind shield of a car or automobile, and will be found to be highly efficient in use and readily taken apart and placed in compact form.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having described our invention what we claim as new and desire to secure by Letters Patent is—

1. The combination with a handle; of a socket carried thereby; a jointed sleeve mounted in said socket; and a plurality of abutting sheets of resilient material mounted in said sleeve, said sheets being bent upon themselves to present two wiping edges the joint between said sheets being staggered, when in their operative position, in order that an unbroken surface may operate over the path of the joint at the opposite side thereof.

2. The combination with a handle; of a transversely arranged socket carried thereby; a jointed tubular sleeve mounted in said socket; and a plurality of abutting sheets of resilient material mounted in said sleeve and curved to conform with the contour thereof and to present two longitudinal wiping edges, said longitudinal edges of said sheets projecting beyond the wall of said sleeve, and the joints between said strips of material being staggered to provide an unbroken surface upon one side thereof to operate over the path of the joint in the opposite side thereof.

In testimony whereof we have signed our names to this specification in the presence of two subscribing witnesses.

WALTER A. ROTH.
FRANK O. MOLDENHAUER.

Witnesses:
HELEN F. LILLIS,
JOSHUA R. H. POTTS.

---

Copies of this patent may be obtained for five cents each, by addressing the "Commissioner of Patents Washington, D. C."